(12) United States Patent
Ringel

(10) Patent No.: US 7,026,067 B2
(45) Date of Patent: Apr. 11, 2006

(54) FUEL CELL STACK WITH INTERNAL GAS CONNECTIONS

(75) Inventor: Helmut Ringel, Niederzier (DE)

(73) Assignee: Forschungszentrum Jülich GmbH, Jülich (DE)

( * ) Notice: Subject to any disclaimer, the term of this patent is extended or adjusted under 35 U.S.C. 154(b) by 267 days.

(21) Appl. No.: 10/333,650

(22) PCT Filed: Jul. 19, 2001

(86) PCT No.: PCT/EP01/08438

§ 371 (c)(1),
(2), (4) Date: Jan. 23, 2003

(87) PCT Pub. No.: WO02/13299

PCT Pub. Date: Feb. 14, 2002

(65) Prior Publication Data

US 2003/0165729 A1    Sep. 4, 2003

(51) Int. Cl.
*H01M 2/08* (2006.01)
*H01M 2/00* (2006.01)
*H01M 2/02* (2006.01)

(52) U.S. Cl. .............................. 429/35; 429/34; 429/36; 429/38; 429/12

(58) Field of Classification Search .................. 429/38, 429/35, 36, 34, 12
See application file for complete search history.

(56) References Cited

U.S. PATENT DOCUMENTS

| | | | |
|---|---|---|---|
| 4,997,726 A | 3/1991 | Akiyama et al. | |
| 5,399,442 A | 3/1995 | Shundo | |
| 6,475,656 B1 * | 11/2002 | Koschany et al. | ............ 429/30 |
| 6,756,147 B1 * | 6/2004 | Bronold et al. | ................ 429/35 |
| 6,852,439 B1 * | 2/2005 | Frank et al. | .................. 429/35 |

FOREIGN PATENT DOCUMENTS

| | | |
|---|---|---|
| DE | 43 34 438 | 4/1995 |
| DE | 196 50 704 | 6/1998 |
| JP | 05174844 | 7/1993 |
| JP | 07245115 | 9/1995 |
| JP | 08007902 | 1/1996 |
| JP | 2000-048831 | * 2/2000 |
| JP | 2000048831 | 2/2000 |

* cited by examiner

*Primary Examiner*—Patrick Joseph Ryan
*Assistant Examiner*—Angela J. Martin
(74) *Attorney, Agent, or Firm*—Renner, Otto, Boisselle and Sklar, LLP

(57) ABSTRACT

The invention relates to a fuel cell stack with a plurality of plate shaped fuel cells. Each fuel cell provides an electrolyte layer, an adjacent electrode and cathode. The fuel cells are connected mechanically and electrically by bipolar plates. Tightness is ensured in an improved manner. The fuel cells provide a cathode, an anode and an electrolyte layer arranged between the cathode and anode. Each cathode is adjacent to a cathode chamber and each anode is adjacent to an anode chamber. The bipolar plates comprise first openings which are used to provide channels to allow operating material to be transported to the fuel cells or to enable the removal of depleted operating material. The bipolar plates have additional openings, in which the fuel cells are arranged. When the fuel cell is disposed in the opening, it is only substantially and openly accessible from one side. This openly accessible side or surface is essentially formed by a fuel cell electrode. Sealing material is arranged layer-by-layer above the other opening. At least one portion of the edge of the fuel cell disposed in the opening is covered by the sealing material.

11 Claims, 1 Drawing Sheet

FUEL CELL STACK WITH INTERNAL GAS CONNECTIONS

DISCLOSURE

The invention relates to a fuel cell stack. Each fuel cell provides an electrolyte layer, an adjacently arranged anode and cathode. The fuel cells are connected mechanically and electrically by bipolar plates. Together with an adjacent electrode, each bipolar plate encloses an electrode chamber. If the electrode is an anode, the chamber is referred to as an anode chamber. Similarly, the chamber adjacent to the cathode is referred to as the cathode chamber. Each electrode chamber provides openings, which are used for the supply or the removal of an operating material.

During operation of the fuel cell, an operating material is fed into each electrode chamber. The fuel is either a fuel such as hydrogen or an oxidation agent, such as oxygen or air. Ions of an operating material, that is, either oxygen ions or hydrogen ions, penetrate the electrolyte layer. The hydrogen ultimately combines with the oxygen to form water with the release of electrical current.

BACKGROUND OF THE INVENTION

Gas-tight separation of the cathode chamber from the anode chamber represents a substantial problem with a fuel cell stack. If an operating material from the anode chamber were able to enter the cathode chamber directly (or vice versa), the consequence would be an oxygen-hydrogen reaction.

The problem of tightness is particularly serious in the case of so-called high temperature fuel cells, because, in addition to temperature loading, thermal stresses also result from the heating and cooling of the fuel cells.

A fuel cell stack of the type described above is disclosed in the specification DE 40 09 138 A1. A plurality of openings are incorporated within the bipolar plates, which are adapted to one another in such a manner that supply channels and/or outlet channels for operating materials are formed as a result.

A fuel cell stack in which at least one electrode is sufficiently thick to be self-supporting is already known. In this context, self-supporting is understood to mean that such an electrode substantially retains its form if the horizontally orientated electrode is held by one corner or one edge and lifted. The portion of the electrode which is not held does not bend as a result of gravity.

A self-supporting electrode of this type may, for example, be 1.5 mm thick. In order to save materials and ensure the functional efficiency of the electrode during operation, the electrode should be as thin as possible. In view of this requirement, an electrode for high temperature fuel cells according to the current state of technology must be at least 0.5 mm thick.

The provision of a self-supporting electrode allows the application of a very thin electrolyte layer to the electrode. A thin electrolyte layer is desirable, because this can then be penetrated rapidly and extensively by the ions of an operating material. The performance of a fuel cell can be improved in direct proportion to the number of ions which can pass through the electrolyte layer.

The problem of tightness in a fuel cell stack is particularly difficult with fuel cells of this type which provide a considerable overall thickness in view of the above-mentioned design.

With reference to fuel cells with self-supporting electrodes, it is already known that channels can be provided from which the operating material passes into the individual electrode chambers of a fuel cell stack. By contrast with the prior art, which is known from the specification DE 40 09 138 A1, these channels are formed from separate structural elements. This is understood to mean that openings for the formation of channels according to specification DE 40 09 138 A1 are not provided in the case of fuel cells with self-supporting electrodes.

The provision of separate structural elements increases the problem of gas tightness because, in this case, an additional component must be sealed, which, under some circumstances, consists of a further material, different from that which has already been used. Additional thermal stresses may result from this.

The object of the invention is to create a fuel cell stack of the type named in the introduction, in which tightness is ensured in an improved manner.

The object of the invention is achieved with a fuel cell stack with the features of claim 1. Advantageous embodiments are described in the dependent claims.

SUMMARY OF THE EMBODIMENTS OF THE INVENTION

The fuel cell stack according to the claims comprises a plurality of plate-shaped fuel cells, which are mechanically and electrically connected by bipolar plates. Each fuel cell comprises a cathode, an anode and an electrolyte layer disposed between the cathode and the anode. Each cathode is adjacent to a cathode chamber, and each anode is adjacent to an anode chamber. The bipolar plates provide first openings thereby forming channels for the supply of operating materials to the fuel cells or for the removal of depleted operating materials. First openings of this kind are already known from the specification DE4009 138 A1.

However, the bipolar plates provide additional openings, in which the fuel cells are disposed. The dimensions of these additional and/or other openings are substantially adapted to the dimensions of the fuel cell. When the fuel cell is disposed in the openings, it is only substantially and openly accessible from one side. This openly accessible side and/or surface is essentially formed by an electrode of the fuel cell. Sealing material is disposed layer-by-layer above the other openings, so that at least a portion of the edge of the fuel cell disposed in the openings is covered by the sealing material. It suffices if less than 1 mm of this surface of the fuel cell is covered at the edge. Moreover, this sealing material is disposed layer-by-layer on the adjacent surface of a bipolar plate in such a manner that the desired extent of sealing is provided. With regard to sealing, attention should be paid to the fact that the various openings, which form the supply and/or outlet channels, are connected in an appropriately gas-tight manner. Furthermore, particular attention should be paid to the fact that a cathode chamber of a fuel cell is separated in a gas-tight manner from the anode chamber of this fuel cell. By providing an opening and extending the sealing material over the edges of the fuel cell, a particularly reliable seal is provided. Thermal stresses resulting from different materials are no longer evident in practice, because the sealing material is disposed predominantly between two bipolar plates, which naturally provide identical coefficients of expansion. The different coefficients of expansion of the fuel cell no longer play any part in practice because, in this context, sealing is achieved by a slight overlap. The sealing material is not in contact with the fuel cell over a large area, which, with different coefficients of thermal expansion, would be particularly problematic.

Moreover, the above structure is simple to manufacture, so that the device according to the claims also provides no problems from this aspect.

The above advantages with reference to tightness can be achieved in particular with fuel cell stacks using fuel cells with at least one self-supporting electrode. A self-supporting electrode of this kind generally provides a thickness of at least 0.5 mm. The electrode preferably should not exceed a thickness of 1.5 mm, amongst other reasons, in order to prevent excessive expenditure on materials. A typical thickness may, for example, be 1 mm.

In practice, it has proved successful to provide the anode as the self-supporting electrode.

Moreover, the advantages with reference to tightness are especially achieved in the case of fuel cells provided for use at high temperatures. The invention is therefore advantageously used for high-temperature fuel cells. High-temperature fuel cells are operated at temperatures above 600° C. In general., a temperature of 1000° C. is not exceeded in high-temperature fuel cells. Typical temperatures are currently in the region of 800° C.

In one embodiment of the invention, glass solder is used as the sealing material. Glass solder tolerates the operating conditions, which occur in a high-temperature fuel cell. It also tolerates the thermally determined changes which are unavoidable in a high-temperature fuel cell.

The fuel cell used in the opening of a bipolar plate advantageously terminates flush with the surface of the bipolar plate onto which the sealing material is applied. A tolerance of approximately ±0.2 mm has proved acceptable in practice. If the above-named surfaces of the fuel cell and/or the bipolar plate are disposed at the same height, the desired tightness between the cathode chamber and the electrode chamber is more readily achieved in a particularly reliable manner. Slight deviations within the context of the above-named tolerances only impair the desired effect to an insignificant extent.

In one further embodiment of the invention, a metallic mesh is provided between the base of the opening and the fuel cell disposed in the opening. The mesh establishes the electrical contact between the electrodes of the fuel cell adjacent to the mesh and the base of the bipolar plate. Furthermore, manufacturing tolerances can be compensated through the mesh.

A rectangular or square fuel cell provides two main surfaces and four lateral edges. In the above-named basic form, one lateral edge passes at right angles into the next lateral edge. By preference, the two opposing edges of each fuel cell are framed by bipolar plates. The bipolar plates then form an indentation, into which the relevant edge of the fuel cell is pressed. On one side of a principal surface of the fuel cell, the edge is separated from the opposing bipolar plate by the sealing material. In this manner, the fuel cell is incorporated into the fuel cell stack in a mechanically stable manner.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

The invention will now be explained with reference to FIGS. 1 and 2.

Figure 1:
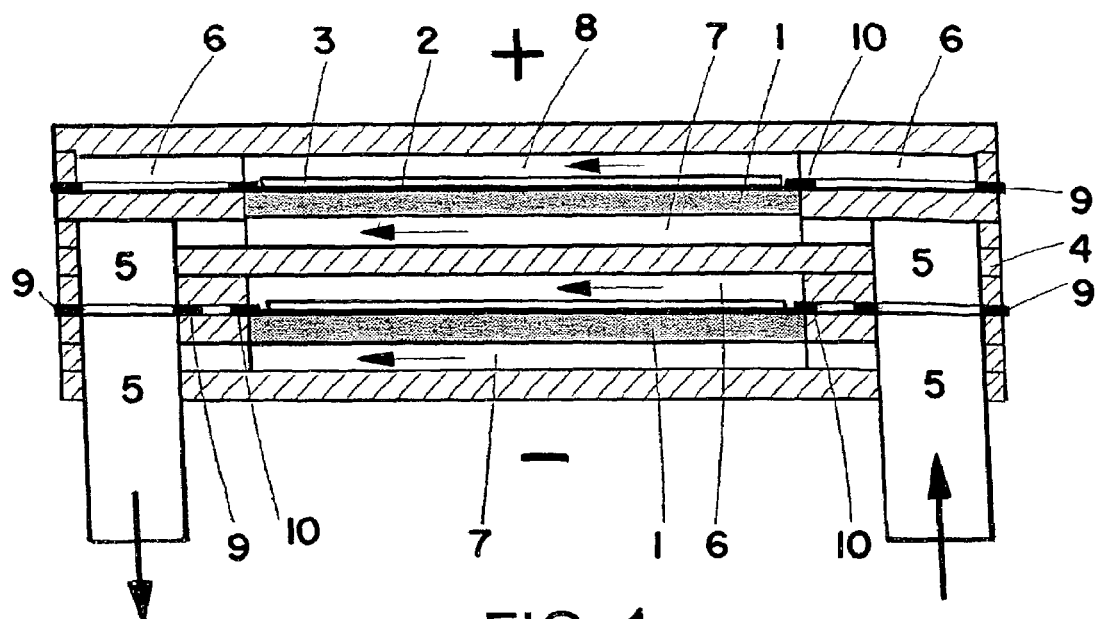
FIG. 1 is a vertical section of a fuel cell stack in accordance with the present invention.

FIG. 1 shows a fuel cell stack, which comprises two fuel cells. Each fuel cell provides a self-supporting anode electrode 1. An electrolyte layer 2 is applied to the self-supporting electrode 1 and, above that, a cathode 3 is applied. Bipolar plates 4 connect the two fuel cells electrically and mechanically to each other. The bipolar plates are provided with openings 5 and 6 in such a manner that, as a result, channels are formed for the supply and removal of operating materials. The four openings 5 shown in FIG. 1 originate either from a front or a rear cutting plane. Furthermore, the bipolar plates are provided with grooves at the sides, which are adjacent to the electrodes of the fuel cells. The anode chambers 7 and cathode chambers 8 are formed by these grooves. Each fuel cell is introduced into a further opening of an associated bipolar plate. The side of the fuel cell facing the opening terminates substantially flush with the neighbouring surface of the bipolar plate. Sealing material 9 and 10 is disposed layer-by-layer and/or strip-by-strip above the fuel cell and the bipolar plate. The sealing material indicated by reference number 10 is disposed above the bordering edge between the bipolar plate 4 and the fuel cell which is introduced into the opening of the bipolar plate. As illustrated the sealing material projects beyond the edge of the openings to ensure that it is covered by the sealing material. The sealing material 10 therefore extends from the corresponding principal surface of the fuel cell up to the neighbouring surface of the bipolar plate. This means that, in practice, the thermal changes along one principal surface of the fuel cell exert no further damaging influence on the portion of the seal which is indicated by reference number 10.

Figure 2:
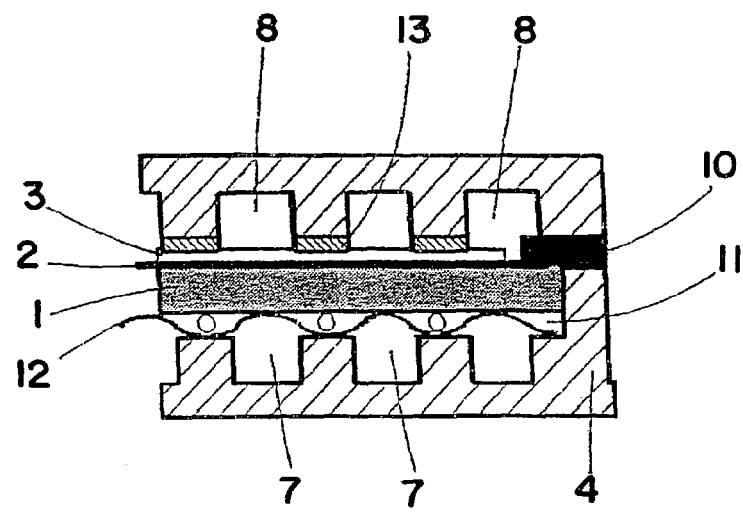
FIG. 2 is a partial enlarged section of one cell, normal to the plane of FIG. 1.

FIG. 2 provides an enlarged detail of the fuel cell stack shown in section in FIG. 1. Furthermore, the section according to FIG. 2 is rotated through 90° by comparison with the section from FIG. 1.

According to FIG. 2, a fuel cell is disposed in an opening 11 of a bipolar plate 4. Between the base of the opening 11 and the fuel cell, a metallic mesh 12 is shown. The bipolar plate 4 adjacent to the other side of the fuel cell is provided with a contact layer 13. An electrical contact between the bipolar plate and the adjacent cathode 3 is established through the contact layer 13.

The framing of one edge of one fuel cell is illustrated in FIG. 2. The edge of the fuel cell formed by the anode 1 projects into an indentation which originated from the form of the bipolar plates. The indentation is a consequence of the opening 11. The edge of the fuel cell projects into this indentation and is framed in the sense of the present invention.

The diagrams relate to an embodiment, in which the flow passes through the cathode chamber and the anode chamber in the same direction. With an appropriate embodiment, it is, of course, also possible for the flow to pass through the cathode chamber transversely to the direction of flow in the anode chamber.

The invention claimed is:

1. A fuel cell stack with a plurality of plate-shaped fuel cells, which are connected mechanically and electrically by bipolar plates (4);
   each fuel cell stack comprises an anode (1), a cathode (3) and an electrolyte layer (2) disposed between the cathode and the anode;
   each cathode is adjacent to a cathode chamber (8) and each anode is adjacent to an anode chamber (7);
   the bipolar plates provide including openings arranged to form channels (5, 6) for the supply of operating materials to the fuel cells or for the removal of depleted operating materials from the fuel cells;
   each bipolar plate including at least one further opening (11) in which a fuel cell is disposed;
   the dimensions of the at least one further opening are substantially adapted to the dimensions of the fuel cell;
   and sealing means (10) arranged layer-by-layer or strip-by-strip covering at least one bordering edge between the fuel cell and the adjacent surface of the bipolar plate in which the fuel cell is disposed, said sealing means projecting beyond the edge to ensure that it is covered.

2. A fuel cell stack according to claim 1, wherein the cathode and/or the anode provides a thickness such that the cathode or the anode is self-supporting.

3. A fuel cell stack according to claim 1, wherein the anode is at least 0.5 mm thick.

4. A fuel cell stack according to claim 1, wherein two bordering edges between the fuel cell and the adjacent surface of the bipolar plate in which the fuel cell is disposed are covered by the sealing means.

5. A fuel cell stack according to claim 1, wherein the sealing means comprises a strip at least 0.1 mm wide of sealing material, arranged layer-by-layer or strip-by-strip and covering the bordering edge between a fuel cell and a bipolar plate, and is arranged above the fuel cell.

6. A fuel cell stack according to claim 5, wherein said sealing material is selected to enable use at temperatures above 600° C., and preferably above 800° C.

7. A fuel cell stack according to claim 6, wherein a glass solder is used as a sealing material.

8. A fuel cell stack according to claim 1, wherein the cathode chambers and anode chambers are formed by the bipolar plates and the cathodes and/or anodes.

9. A fuel cell stack according to claim 1, wherein a principal surface of a fuel cell terminates flush with the surface of the bipolar plate which is adjacent to the further opening.

10. A fuel cell stack according to claim 1, wherein a metallic mesh is arranged layer-by-layer in at least one of the further openings between the base of the opening and the fuel cell disposed in the opening.

11. A fuel cell stack according to claim 1, wherein at least two edges of each fuel cell are framed by said bipolar plates.

* * * * *